United States Patent [19]

Hibino et al.

[11] Patent Number: 5,475,455
[45] Date of Patent: Dec. 12, 1995

[54] INFORMATION RECORDING DEVICE

[75] Inventors: Hideo Hibino, Kawasaki; Kazuyuki Kazami, Tokyo; Norikazu Yokonuma, Yokohama; Youichi Yamazaki, Kawasaki, all of Japan

[73] Assignee: Nikon Corporation, Tokyo, Japan

[21] Appl. No.: 208,472

[22] Filed: Mar. 10, 1994

[30] Foreign Application Priority Data

Mar. 12, 1993 [JP] Japan ..................... 5-052629

[51] Int. Cl.⁶ .................................... C03B 17/24
[52] U.S. Cl. ............................. 354/106
[58] Field of Search .................. 354/105, 106, 354/173.1, 173.11

[56] References Cited

U.S. PATENT DOCUMENTS

| | | | |
|---|---|---|---|
| 4,963,917 | 10/1990 | Takeguchi et al. | 354/484 |
| 5,142,310 | 8/1992 | Takeguchi et al. | 354/106 |
| 5,191,489 | 3/1993 | Isozaki | 54/64 |
| 5,218,392 | 6/1993 | Sakamoto et al. | 354/106 |
| 5,296,889 | 3/1994 | Imai | 354/412 |
| 5,313,236 | 5/1994 | Isokawa | 354/106 |

Primary Examiner—Michael L. Gellner
Assistant Examiner—Nicholas J. Tuccillo
Attorney, Agent, or Firm—Oliff & Berridge

[57] ABSTRACT

In a camera comprising a CPU, a film feeding section, a serial data clock creating circuit section, a PPM conversion circuit section, a photographic information output circuit section, and a magnetic head drive section, the CPU produces a reference clock CLK depending on a film winding speed in the film feeding section, and the serial data clock creating circuit section creates a serial data clock SCK corresponding to the reference clock CLK. The CPU converts photographic information from the photographic information output circuit section into serial data and outputs the serial data in synchronization with the serial data clock SCK. Based on the serial data and the reference clock CLK both from the CPU, the PPM conversion circuit section converts photographic information into a PPM signal and outputs the PPM signal to the magnetic head drive section for magnetically recording it on a film.

11 Claims, 7 Drawing Sheets

INFORMATION RECORDING DEVICE

BACKGROUND OF THE INVENTION

1. Field of the Invention

The present invention relates to an information recording device which magnetically records information consisted of a plurality of bits by a PPM recording method.

2. Related Background Art

The PPM (pulse position modulation) recording method is a per se known method of magnetically recording data upon a magnetic recording medium. FIG. 5 shows signal waveforms used in the PPM recording method.

In the PPM recording method, both data and a clock are transmitted through a single line, and therefore the PPM recording method is also called the self-clock method.

The PPM recording method is designed to determine whether a signal level is "0" or "1" depending on the event occurrence position of the signal waveform. More specifically, the signal of which the event occurs within a half period from the head of the signal period is determined to be "0", and the signal of which the event occurs after the half period is determined to be "1". In FIG. 5, for example, the signal of which the trailing edge of the single waveform occurs at a position approximately one quarter period from the head of the signal period is determined to be 0 (i.e., called a PPM signal of 25% bit location), and the signal of which the trailing edge of the signal waveform occurs at a position approximately three quarter period from the head of the signal period is determined to be 1 (i.e., called a PPM signal of 75% bit location).

The above method enables data to be transmitted correctly even if the trailing edge position in the signal period is somewhat shifted due to a delay over the data line or other cause. When data of "0" is to be transmitted in FIG. 5, it is recognized as data of "0" so long as the signal waveform drops before its half period, even if the data that should drop at one quarter period from the head of the signal period is lagged to actually drop behind the quarter period due to a delay over the data line or other cause. As a result, an error in transmission of data is less likely to occur.

Meanwhile, there are known cameras of the type magnetically recording photographic information, such as the date and exposure data, on a film. Such magnetic recording can be practiced in two ways; i.e., a method of moving a magnetic head with the position of a film, as a magnetic medium, kept fixed, and a method of moving a film with a magnetic head kept fixed. Because a film is always wound on in cameras each after taking a photograph, the latter magnetic recording method is generally employed by utilizing movement of the film during the winding-on thereof.

When photographic information is magnetically recorded on a film by using the above-described PPM recording system, the photographic information is required to be converted into serial data before start of the magnetic recording. At this time, it is usual to perform the conversion into serial data in accordance with a CPU system clock in a camera. However, as changing a frequency of the CPU system clock is not easy, the serial data cannot be output at an arbitrary clock frequency and hence the magnetic recording can not be made with any desired magnetic recording density.

Further, because the film winding speed is varied depending on the power capacity of a battery loaded in a camera, a film is wound at a lower speed if the remaining power capacity of the battery is small. But an ordinary CPU is designed to output the serial data at a constant speed irrespective of the film winding speed. Therefore, if the remaining power capacity of the battery is small, the photographic information is magnetically recorded on a film more closely than usual. This gives rise to a possibility that the magnetically recorded information may interfere mutually and can not be correctly reproduced in some cases.

SUMMARY OF THE INVENTION

The primary objective of the present invention is to provide an information recording device which can magnetically record information by a PPM recording method with any desired magnetic recording density.

In order to attain this primary objective, an information recording device capable of magnetically recording a plurality of types of information on a magnetic medium comprises an information output circuit which outputs the information consisted of a plurality of bits, a control circuit which converts the information into serial data and outputs the serial data in synchronization with a serial data clock, a serial data clock creating circuit provided externally of the control circuit which creates the serial data clock having a predetermined frequency based on an output clock delivered from said control circuit and inputs it to the control circuit, a PPM signal conversion circuit which converts the serial data into a PPM signal, and a magnetic recording device which magnetically records the PPM signal on a magnetic medium.

Information consisted of a plurality of bits output from the information output circuit is supplied to the control circuit. The serial data clock creating circuit creates a serial data clock having a predetermined frequency based on an output clock delivered from the control circuit, and supplies the serial data clock to the control circuit. The control circuit converts the information into serial data and outputs the serial data in synchronization with the serial data clock. The PPM signal conversion circuit converts the serial data into a PPM signal and outputs it. The magnetic recording device magnetically records the PPM signal on a magnetic medium. Thus, since the serial data clock as a basis for conversion into the PPM signal is created externally of the control circuit comprising a CPU or the like, magnetic recording can be made with any desired magnetic recording density.

Also, the above objective is achieved by a camera equipped with an information recording device capable of magnetically recording information related to photography on a film, wherein the camera comprises a photographic information output circuit which outputs the information related to photography, a control circuit which converts the photographic information into serial data and outputs the serial data in synchronization with a serial data clock, a serial data clock creating circuit provided externally of the control circuit which creates the serial data clock having a predetermined frequency based on an output clock delivered from said control circuit and inputs it to the control circuit, a PPM signal conversion circuit which converts the serial data into a PPM signal, and a magnetic recording device which magnetically records the PPM signal on the film.

Photographic information output from the photographic information output circuit is supplied to the control circuit. The serial data clock creating circuit creates a serial data clock having a predetermined frequency based on an output clock delivered from the control circuit, and supplies the serial data clock to the control circuit. The control circuit converts the photographic information into serial data and outputs the serial data in synchronization with the serial data clock. The PPM signal conversion circuit converts the serial data into a PPM signal and outputs it. The magnetic recording device magnetically records the PPM signal on a magnetic medium, i.e., a film. As a result, magnetic recording can be made with any desired magnetic recording density.

Another objective of the present invention is to provide a camera equipped with an information recording device which can magnetically record photographic information at a rate corresponding to the film winding speed.

To achieve the above objective, a camera equipped with an information recording device capable of magnetically recording information related to photography on a film comprises a photographic information output circuit which outputs the information related to photography, a film winding speed detecting circuit which detects a winding speed of the film, a control circuit which converts the parallel data into serial data depending on the detected film winding speed and outputs the serial data in synchronization with a serial data clock, a PPM signal conversion circuit which converts the serial data into a PPM signal, and a magnetic recording device which magnetically records the PPM signal on the film.

Photographic information output from the photographic information output circuit is supplied to the control circuit. The control circuit converts the photographic information into serial data depending on the film winding speed detected by the film winding speed detecting circuit. The PPM signal conversion circuit converts the serial data into a PPM signal and outputs it. The magnetic recording device magnetically records the PPM signal on a magnetic medium, i.e., a film. As a result, magnetic recording can be made with a magnetic recording density corresponding to the film winding speed.

DESCRIPTION OF THE PREFERRED EMBODIMENTS

First Embodiment

Hereinafter, a first embodiment in which the present invention is supplied to a camera will be described with reference to FIGS. 1 to 4. Note that camera components which are not directly related to the present invention are precluded from FIG. 1.

Figure 1:
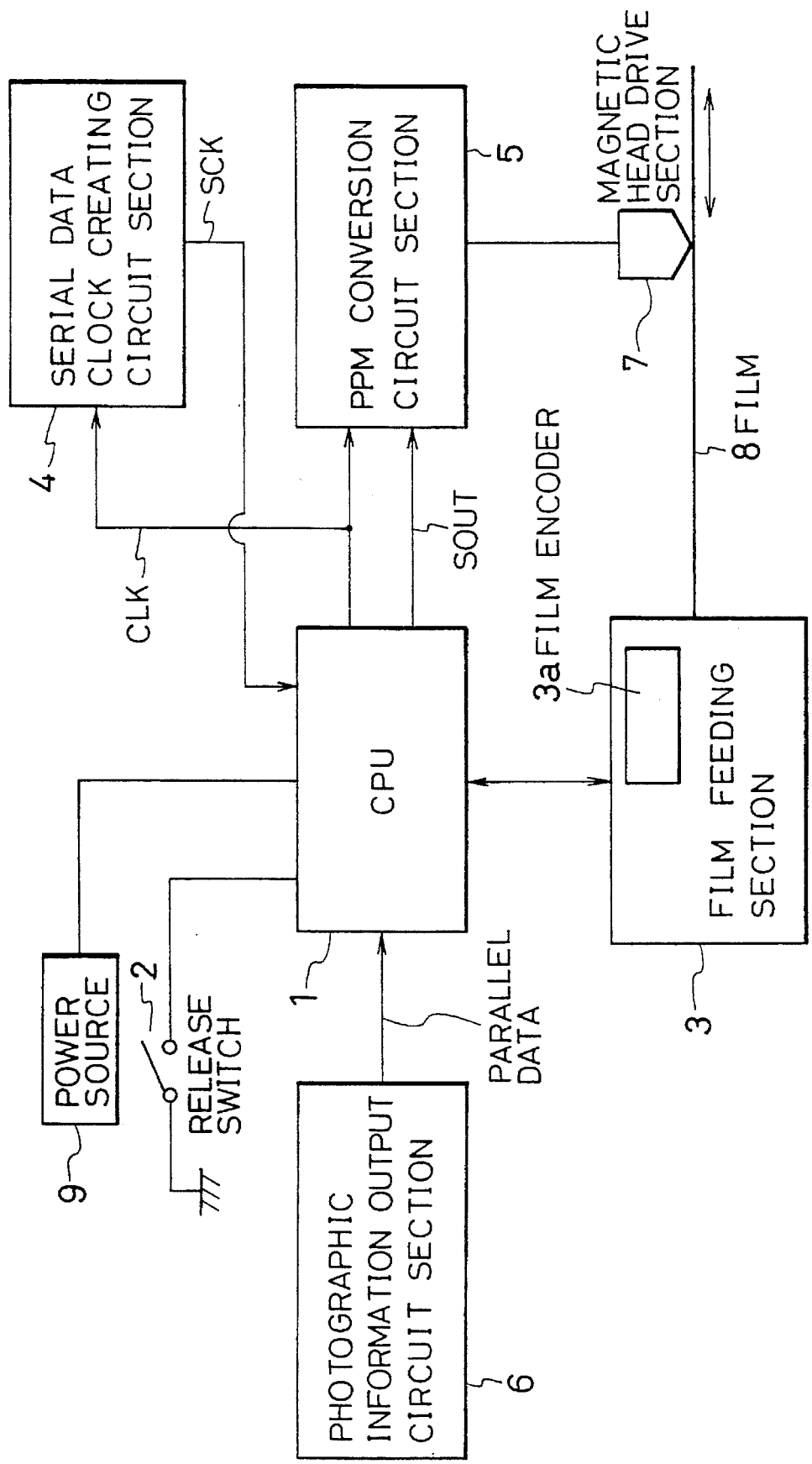
FIG. 1 is a block diagram of a first embodiment.

Referring to FIG. 1, denoted by reference numeral 1 is a CPU for controlling the entirety of a camera. 2 is a release switch, 3 is a film feeding section for winding on and rewinding a film 8, and 4 is a serial data clock creating circuit section for creating a serial data clock corresponding to a film winding speed. 5 is a PPM conversion circuit section for converting serial data output from the CPU 1 into a PPM signal, 6 is a photographic information output circuit section for outputting the date, exposure data, etc., and 7 is a magnetic head drive section which magnetically records the PPM signal on the film 8.

In the camera constructed as shown in FIG. 1, when the release switch 2 is depressed, the CPU 1 carries out control for photographing and also instructs the film feeding section 3 to wind on the film. When the film feeding section 3 starts winding on the film, a film encoder 3a provided in the film feeding section 3 supplies, to the CPU 1, a pulse signal corresponding to the speed at which the film is wound on. The CPU 1 detects the film winding speed based on the supplied pulse signal, and then supplies a reference clock CLK to the serial data clock creating circuit section 4 after changing a frequency of the reference clock CLK depending on the film winding speed. The serial data clock creating circuit section 4 creates a serial data clock SCK based on the reference clock CLK output from the CPU 1, and then supplies the created clock SCK to the CPU 1.

The CPU 1 converts photographic information from the photographic information output circuit section 6 into serial data SOUT in synchronization with the serial data clock SCK, and then supplies the serial data SOUT to the PPM conversion circuit section 5. The PPM conversion circuit section 5 converts the serial data SOUT into a PPM signal based on the reference clock CLK from the CPU 1, followed by supplying the PPM signal to the magnetic head drive section 7. The magnetic head drive section 7 converts the PPM signal into magnetic information and magnetically records it on the film 8.

Figure 2:
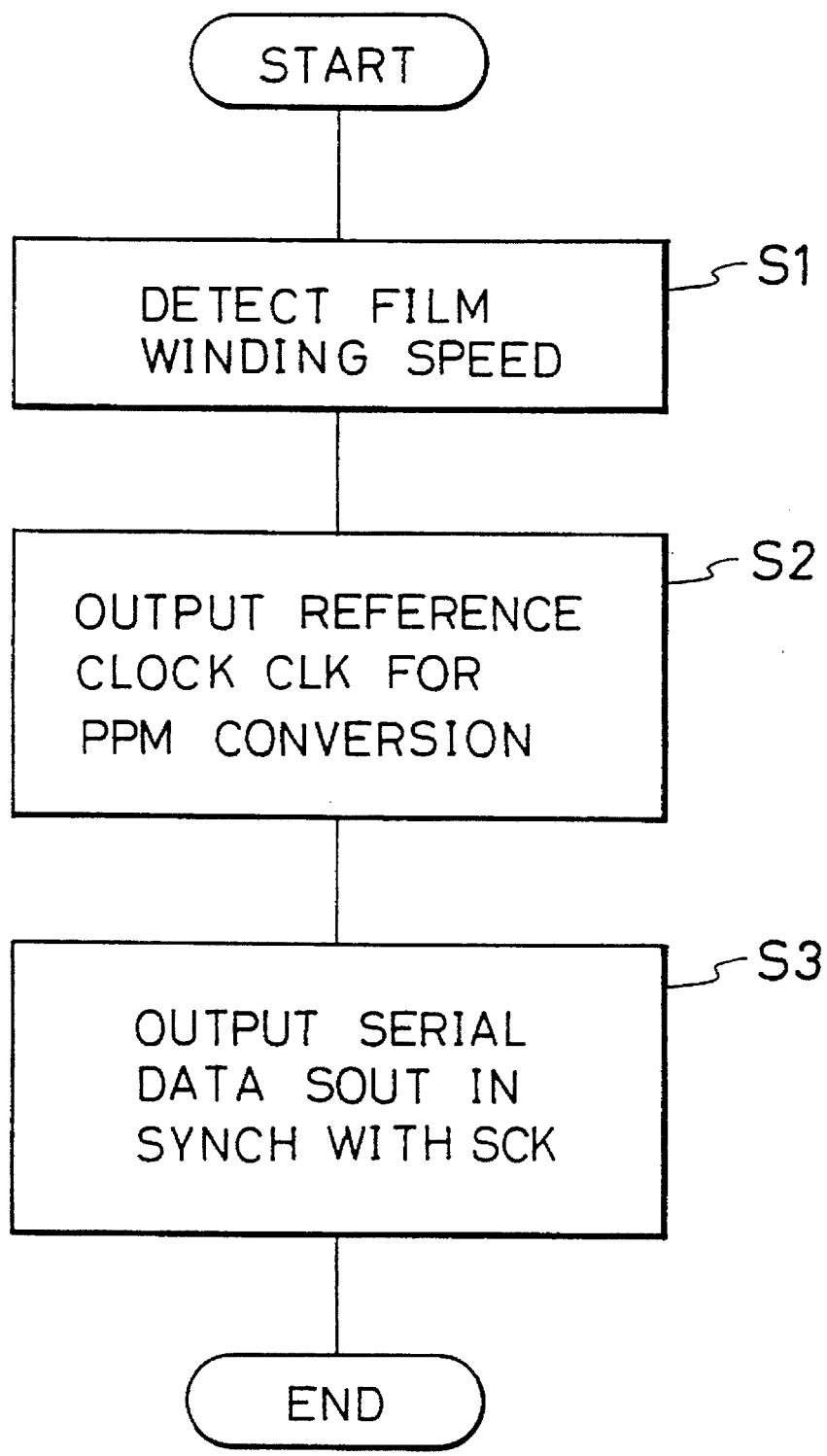
FIG. 2 is a flowchart showing operation of a CPU in FIG. 1.

FIG. 2 is a flowchart showing operation of the CPU 1.

In step S1, the CPU 1 takes in the pulse signal corresponding to the film winding speed from the film encoder 3a in the film feeding section 3 to determine the film winding speed. In step S2, the CPU 1 changes the frequency of the reference clock CLK depending on the detected film winding speed, and then supplies the resultant reference clock CLK to the serial data clock creating circuit section 4.

Assuming that the magnetic recording density is 10 bit/mm and the bit location of the PPM signal is 25%, for example, if the detected film winding speed is 100 mm/s, the frequency of the serial data clock is given by 10 bit/mm× 100 mm/s=1 KHz and, therefore, the frequency of the reference clock CLK is set to four times 1 KHz, i.e., 4 KHz, and then output. The reason why the frequency of the reference clock CLK is increased fourfold is that when the PPM signal with the bit location of 25% and the period of 1 KHz is to be created, it is required to change a level of the PPM signal at ¼ or ¾ period of 1 KHz period.

In step S3, the CPU 1 serially outputs the serial data SOUT to the PPM conversion circuit section 5 in synchronization with the serial data clock SCK output from the serial data clock creating circuit section 4.

Figure 3:
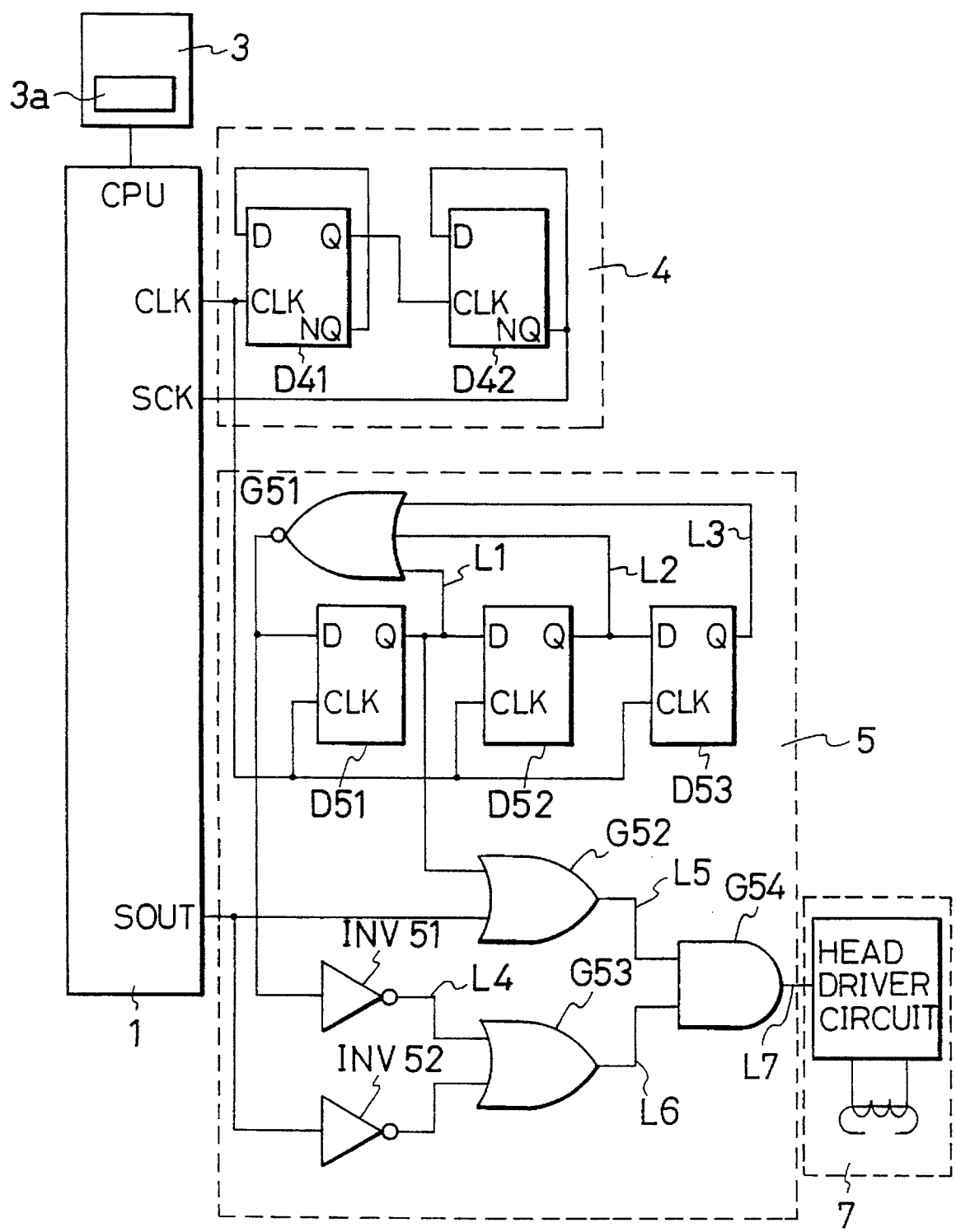
FIG. 3 is a circuit diagram of a serial data clock creating circuit section and a PPM conversion circuit section in the first embodiment.

FIG. 3 is a circuit diagram showing details of the serial data clock creating circuit section 4 and the PPM conversion circuit section 5 shown in FIG. 1. The illustrated serial data clock creating circuit section 4 represents an example in which the serial data clock SCK is created by dividing the frequency of the reference clock CLK output from the CPU 1 by four. Generally, the frequency f (Hz) of the serial data clock SCK is expressed by f=F×(100/BL) on an assumption that the frequency of the PPM signal resulted from the conversion is F (Hz) and the bit location of the PPM signal is BL (%).

The serial data clock creating circuit section 4 in FIG. 3 comprises two flip-flops D41, D42 connected in series. When the reference clock CLK output from the CPU 1 is supplied to a CLK terminal of the first-stage flip-flop D41, the serial data clock SCK of which frequency is equal to a quarter of that of the reference clock CLK is output from an NQ terminal of the second-stage flip-flop D42. The serial data clock SCK is input to an SCK terminal of the CPU 1.

The PPM conversion circuit section 5 in FIG. 3 comprises three flip-flops D51 to D53 driven in synchronization with the reference clock CLK output from the CPU 1, a NOR gate G51 to which Q outputs of the three flip-flops are supplied, an OR gate G52 to which the serial data SOUT from the CPU 1 and the Q output of the flip-flop D51 are supplied, an inverter INV51 for inverting an output of the NOR gate G51, an inverter INV52 for inverting the serial data SOUT, an OR gate G53 to which outputs of the both the inverters INV51, INV52 are supplied, and an AND gate G54 to which outputs of both the OR gates G52, G53 are supplied. An output of the AND gate G54 is supplied to the magnetic head drive section 7.

Figure 4:
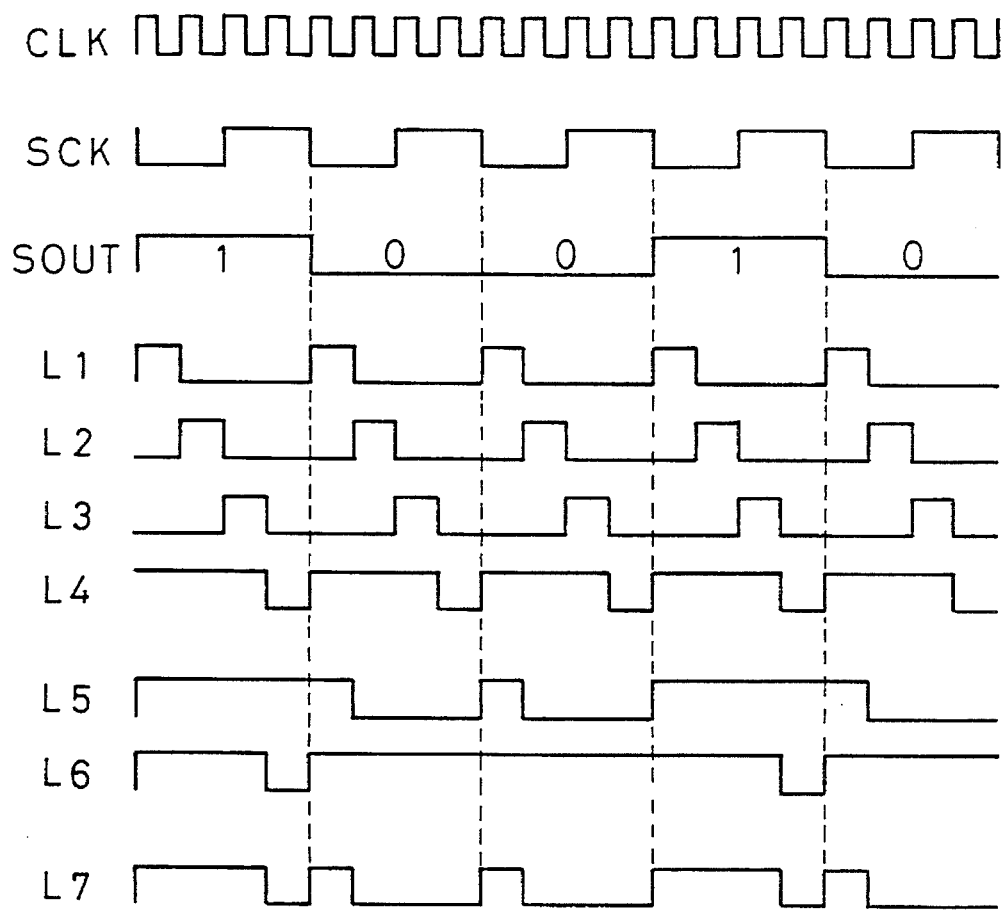
FIG. 4 is a timing chart for the circuit of FIG. 3.
Figure 5:
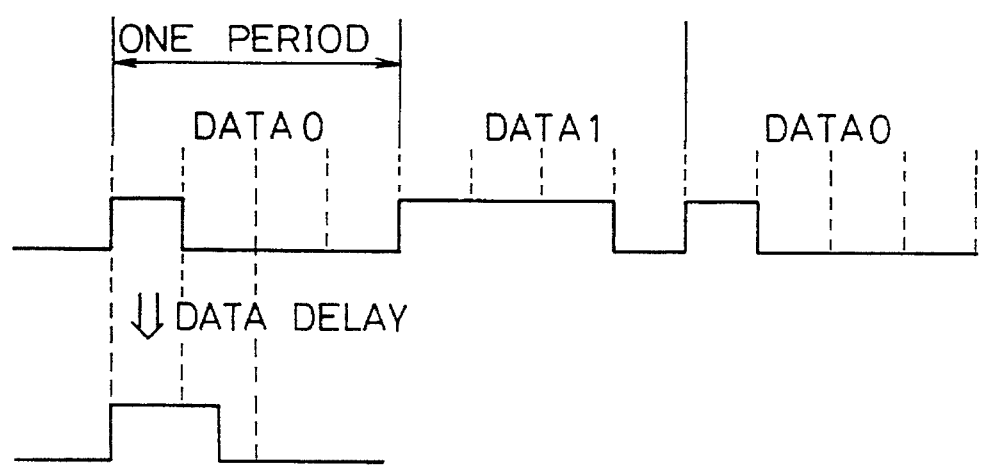
FIG. 5 is a timing chart showing signal waveforms used with a PPM recording system.

FIG. 4 is a timing chart showing operation of the PPM conversion circuit section 5 in FIG. 3. This timing chart represents an example in which the serial data SOUT is input from the CPU 1 to the PPM conversion circuit section 5 in sequence of "10010". The operation of the PPM conversion circuit section 5 will now be described with reference to waveforms L1 to L7 in FIG. 4.

A signal L1 as the Q output of the flip-flop D51 rises in response to the first rising of the reference clock CLK, and falls in response to the next rising of the reference clock CLK. The flip-flop D52 latches the signal L1 in response to the rising of the reference clock CLK and outputs it as a signal L2. The flip-flop D53 latches the signal L2 in response to the rising of the reference clock CLK and outputs it as a signal L3.

The output of the NOR gate G51 assumes a high level only when the signals L1 to L3 are all at a low level, and the inverter INV51 outputs a signal L4 which is resulted by inverting the output of the NOR gate G51. These signals L1 to L4 are repeated in the same waveforms for each period of the serial data clock SCK. The OR gate G52 outputs a logical sum signal L5 between the signal L1 and the serial data SOUT, whereas the OR gate G53 outputs a logical sum signal L6 between the signal L4 and the signal inverted the serial data SOUT. The AND gate G54 outputs a logical product signal L7 between the output signal L5 of the OR gate G52 and the output signal L6 of the OR gate G53.

The signal L7 represents a PPM signal into which the serial data SOUT is converted, and photographic information expressed by the signal L7 is magnetically recorded on the film 8 via the magnetic head drive section 7.

The signal L7 corresponding to the first data "1" in the serial data SOUT of "10010" changes from high level into low level at a position corresponding to 75% of a period of the serial data clock SCK. The signal L7 corresponding to the second data "0" changes from high level into low level at a position corresponding to 25% of a period of the serial data clock SCK. The above equally supplies to the subsequent data. Thus, the circuit of FIG. 3 converts the serial data SOUT from the CPU 1 into the PPM signal with the bit location of 25% when the serial data SOUT is "0", and into the PPM signal with the bit location of 75% when it is "1".

From the waveform of the signal L7 in FIG. 4, it is seen that the frequency of the PPM signal is equal to the frequency of the serial data clock SCK created by the serial data clock creating circuit section 4. Consequently, by changing the frequency of the serial data clock SCK created by the serial data clock creating circuit section 4, the serial data can be converted into the PPM signal having any desired frequency and hence the bit location is variable so as to produce a signal with any desired bit location.

As described above, the film encoder 3a outputs the pulse signal corresponding to the film winding speed, and the CPU 1 produces the reference clock CLK depending on the pulse frequency, and further the serial data clock creating circuit section 4 creates the serial data clock SCK corresponding to the reference clock CLK. Therefore, as the power capacity lowers, the frequency of the serial data clock SCK is reduced correspondingly so that the magnetic recording density is kept constant regardless of the power capacity.

Additionally, when the serial data SOUT is converted into the PPM signal using only the serial data clock SCK, the frequency of the PPM signal converted is as low as a fraction of that of the serial data clock SCK. Therefore, the conventional CPU had to be designed to output not only the serial data clock SCK, but also the reference clock CLK for conversion into the PPM signal. For this reason, such a special CPU as provided with two oscillator sources and being able to output two clocks simultaneously was required in the prior art. With the above-described embodiment, on the contrary, because the serial data clock SCK is created by the circuit externally of the CPU, the CPU is not required to output two clocks, allowing use of an inexpensive CPU. As a result, the cost of a camera employing the PPM recording system can be reduced.

Second Embodiment

The above first embodiment has been described as creating the serial data clock SCK externally of the CPU. To practice the first embodiment, however, it is necessary to newly provide a circuit for creating the serial data clock SCK. On the other hand, a second embodiment below is so arranged as to produce the serial data SOUT inside the CPU without using the serial data clock SCK.

Figure 6:
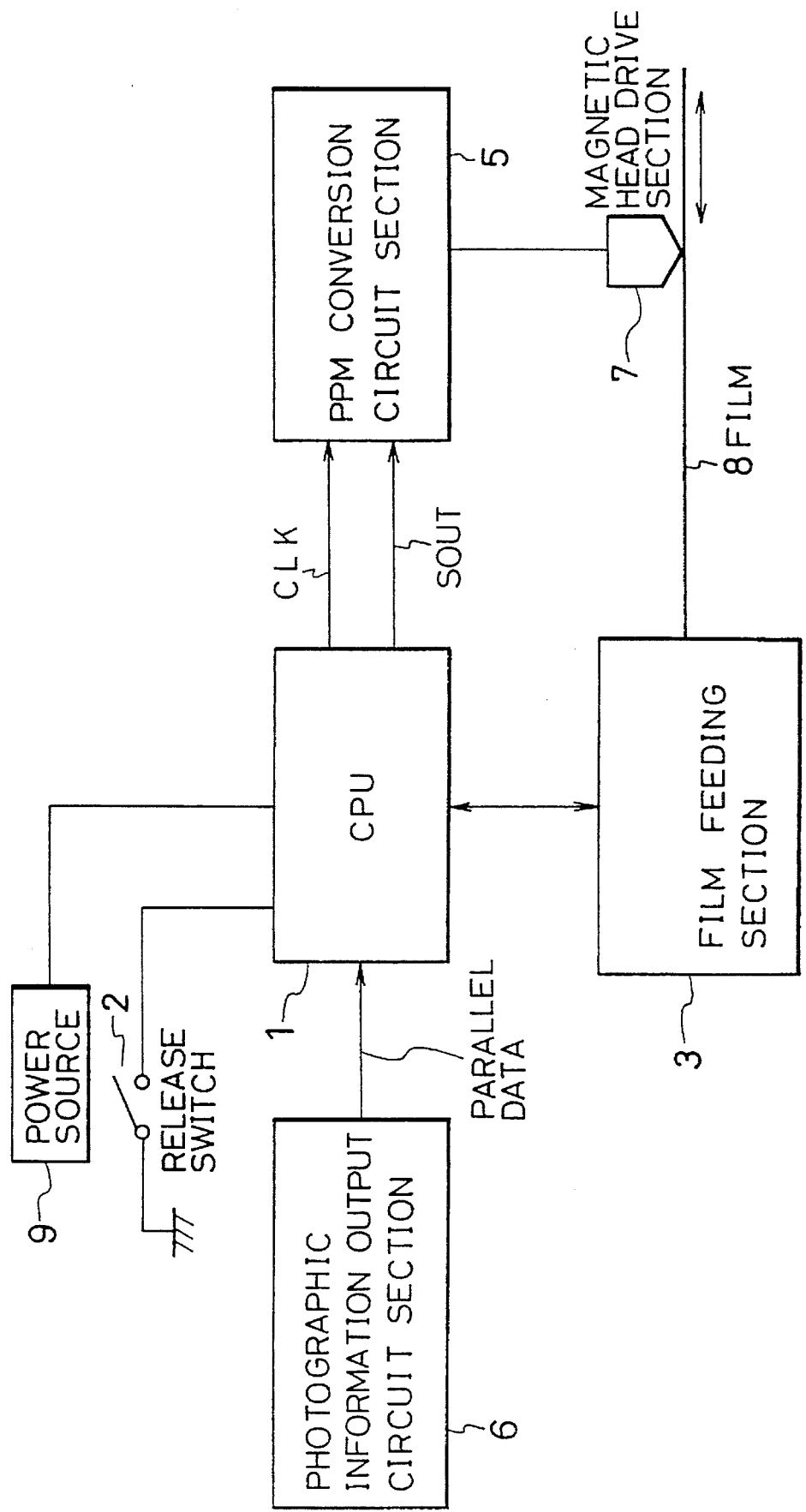
FIG. 6 is a block diagram of a second embodiment.
Figure 7:
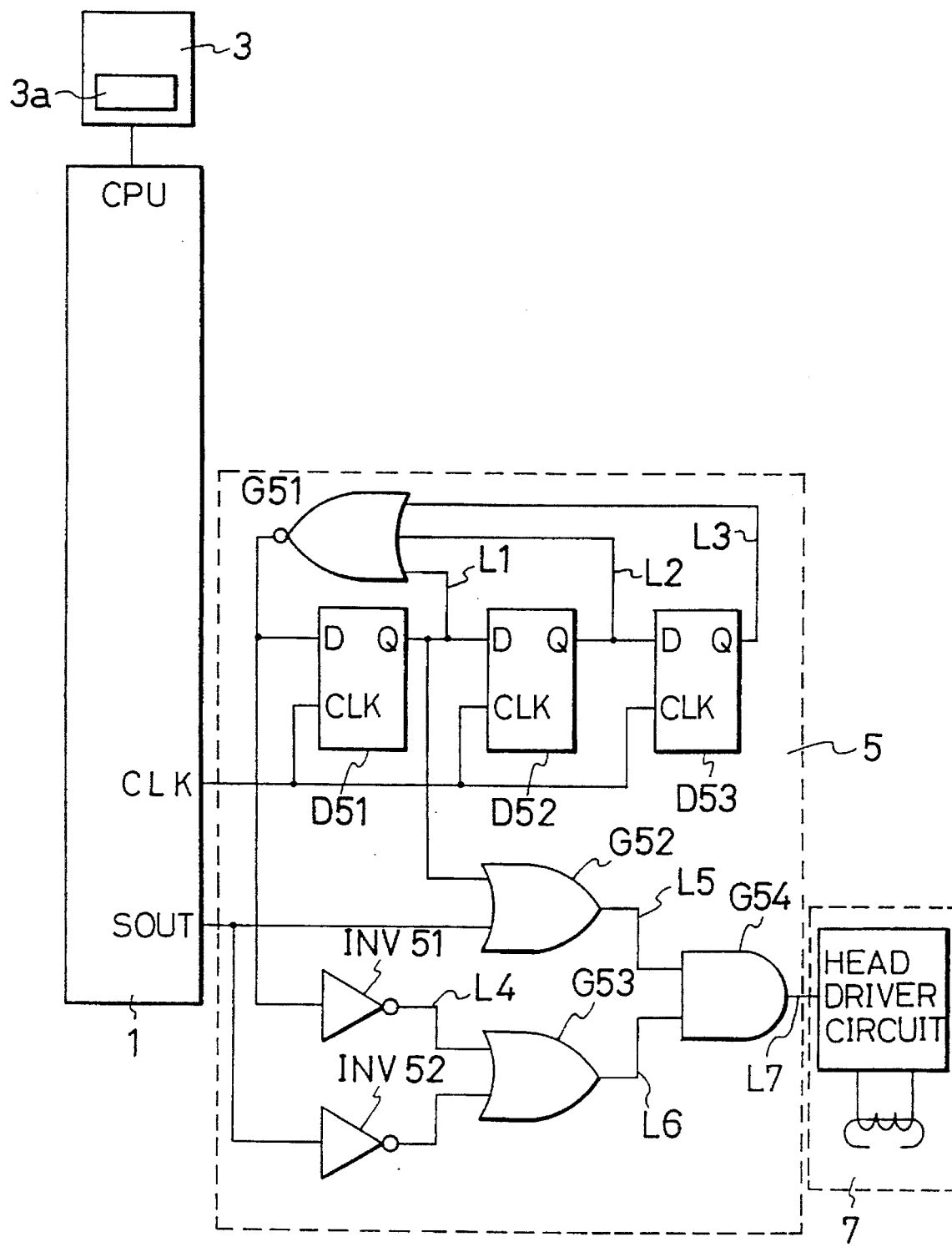
FIG. 7 is a circuit diagram of a serial data clock creating circuit section in the second embodiment.

FIG. 6 is a block diagram of the second embodiment. The second embodiment is common in its arrangement to the first embodiment shown in FIG. 1 except that no serial data clock creating circuit section is provided. Also, a circuit diagram of a PPM conversion circuit section of the second embodiment shown in FIG. 7 is the same as that of the PPM conversion circuit section of the first embodiment shown in FIG. 3.

Figure 8:
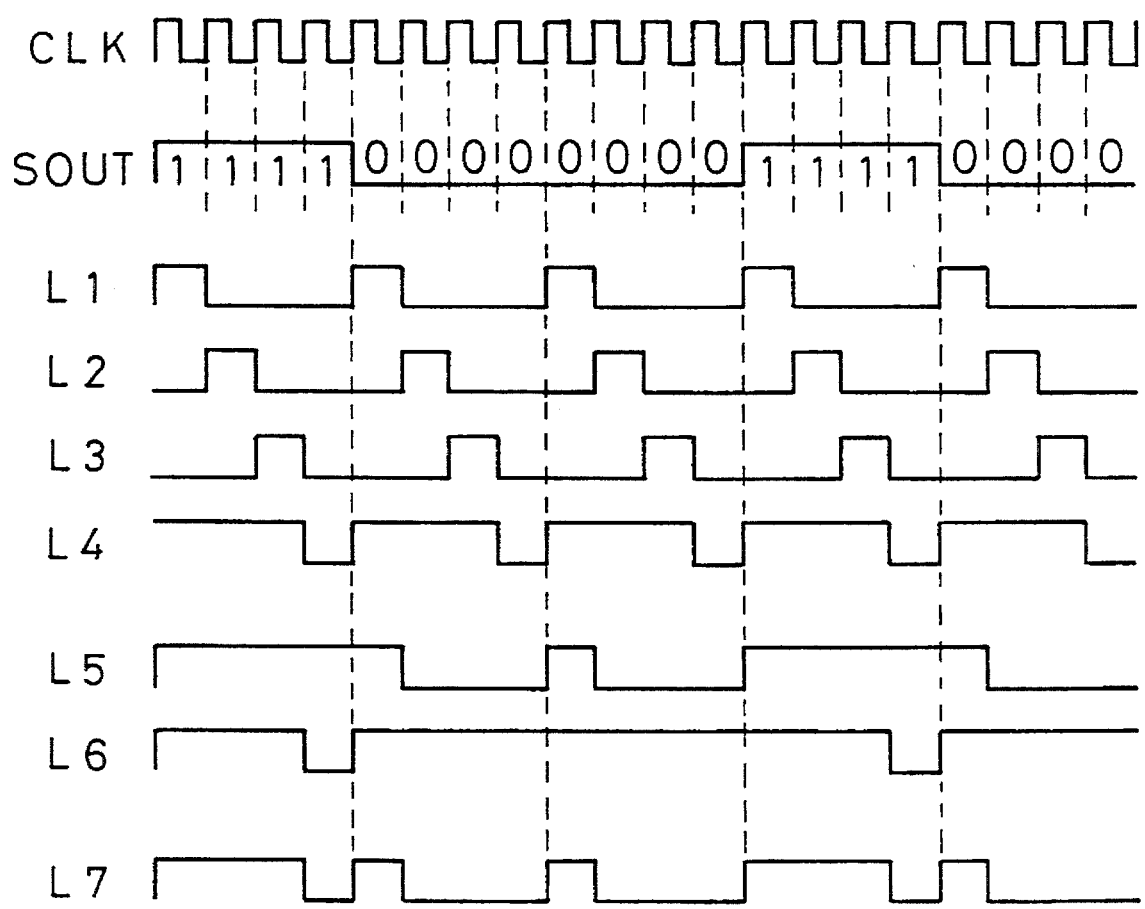
FIG. 8 is a timing chart for the circuit of FIG. 7.

In this second embodiment, the serial data SOUT is delivered to the PPM conversion circuit section 5 in synchronization with the serial data clock SCK. On this occasion, the same data is output for four periods of the reference clock CLK, i.e., 4 clocks, in succession. When data "1" is to be output, by way of example, data "1" is delivered continuously for 4 clocks. FIG. 8 shows an example in which serial data of "10010" is delivered.

Thus, by setting the period of the serial data SOUT to be fourfold that of the reference clock CLK, the serial data SOUT can be output at the same period as output in the first embodiment shown in FIG. 4.

Note that the period of the serial data output from the CPU 1 is not limited to four times, it is only required to output the serial data at a period corresponding to the circuit configuration of the PPM conversion circuit section 5.

As described above, while the second embodiment is inferior to the first embodiment in that the burden imposed on the CPU 1 is increased, it is superior to the first embodiment in point of requiring the simpler circuit configuration and reducing the cost.

It should be understood that the above first and second embodiments have been described as supplying the information recording device of the present invention to a camera, the present invention is also applicable to other various equipment such as a tape recorder and a cassette streamer, in addition to a camera.

We claim:

1. An information recording device capable of magnetically recording a plurality of types of information on a magnetic medium, comprising:

an information output circuit which outputs the information consisted of a plurality of bits;

a control circuit which converts said information into serial data and outputs said serial data in synchronization with a serial data clock;

a serial data clock creating circuit provided outside said control circuit which creates said serial data clock having a predetermined frequency based on an output clock delivered from said control circuit and inputs said serial data clock to said control circuit, a PPM signal conversion circuit which converts said serial data into a PPM signal; and a magnetic recording device which magnetically records said PPM signal on a magnetic medium.

2. An information recording device according to claim 1, wherein said serial data clock creating circuit creates said serial data clock by dividing the frequency of said output clock by $2^n$, (where n is a natural number).

3. An information recording device according to claim 1, wherein said PPM signal conversion circuit converts said serial data into said PPM signal in synchronization with said output clock.

4. An information recording device according to claim 1, wherein said PPM signal conversion circuit sets a period of said serial data clock and a period of said PPM signal equal to each other.

5. An information recording device according to claim 1, wherein said PPM signal conversion circuit changes a ratio of high-level duration to low-level duration of said PPM signal depending on the frequency of said serial data clock.

6. An information recording device according to claim 1, wherein said control circuit includes a central processing unit.

7. A camera equipped with an information recording device capable of magnetically recording information related to photography on a film, comprising:

a photographic information output circuit which outputs the information related to photography;

a control circuit which converts said photographic information into serial data and outputs said serial data in synchronization with a serial data clock;

a serial data clock creating circuit provided outside said control circuit which creates said serial data clock of having a predetermined frequency based on an output clock delivered from said control circuit and inputs said serial data clock to said control circuit;

a PPM signal conversion circuit which converts said serial data into a PPM signal; and a magnetic recording device which magnetically records said PPM signal on said film.

8. A camera equipped with an information recording device capable of magnetically recording information related to photography on a film, comprising:

a photographic information output circuit which outputs the information related to photography;

a film winding speed detecting circuit which detects a winding speed of said film;

a control circuit which converts said photographic information into serial data depending on said detected film winding speed and outputs said serial data in synchronization with a serial data clock;

a PPM signal conversion circuit which converts said serial data into a PPM signal; and a magnetic recording device which magnetically records said PPM signal on said film.

9. A camera equipped with an information recording device according to claim 8, further comprising a serial data clock creating circuit which creates said serial data clock based on an output clock delivered from said control circuit, wherein:

said control circuit delivers said output clock depending on the film winding speed detected by said film winding speed detecting circuit.

10. A camera equipped with an information recording device according to claim 8, wherein said control circuit increases an output rate of said serial data at the higher film winding speed detected by said film winding speed detecting circuit.

11. An information recording device capable of magnetically recording a plurality of types of information on a magnetic medium, comprising:

an information output circuit which outputs the information consisted of a plurality of bits;

a control circuit which converts said information into serial data and outputs said serial data;

a PPM signal conversion circuit which converts said serial data into a PPM signal; and a magnetic recording device which magnetically records said PPM signal on a magnetic medium;

wherein said control circuit includes:

a reference clock output section for outputting a reference clock having a predetermined frequency; and an output control section for controlling an output of said serial data so that said serial data are output only for plural periods of said reference clock.

* * * * *